United States Patent [19]
Orescan

[11] 3,913,436
[45] Oct. 21, 1975

[54] BAND SAW MACHINE

[76] Inventor: Michael Orescan, Box 458, Harriston, Ontario, Canada, NOG ZO

[22] Filed: Jan. 7, 1974

[21] Appl. No.: 431,485

[52] U.S. Cl. .................... 83/409; 83/788; 83/810; 83/820
[51] Int. Cl.² ............................................ B26D 1/46
[58] Field of Search ............. 83/809, 810, 820, 648, 83/788, 409

[56] References Cited
UNITED STATES PATENTS

| | | | |
|---|---|---|---|
| 2,162,848 | 6/1939 | Kulp | 83/810 |
| 2,274,923 | 3/1942 | Hedgpeth | 83/810 X |
| 3,142,321 | 7/1964 | Orescan | 83/810 |

FOREIGN PATENTS OR APPLICATIONS

| | | | |
|---|---|---|---|
| 41,798 | 12/1907 | Switzerland | 83/810 |

Primary Examiner—Harrison L. Hinson
Assistant Examiner—Leon Gilden
Attorney, Agent, or Firm—Clarence A. O'Brien; Harvey B. Jacobson

[57] ABSTRACT

A band saw is provided and includes a workpiece support table having a base portion which may be variably inclined and secured in adjusted inclined position with the base portion inclined downwardly in the direction in which a workpiece is to be advanced relative to the blade of the band saw. The workpiece support table further includes a workpiece support portion mounted on the base portion for rectilinear shifting along the path of inclination of the base portion of the support table. The workpiece support portion includes structure for clamping a workpiece thereto and the workpiece support portion is supported from the base portion for free rectilinear movement therealong, whereby the workpiece support portion will tend to move, by gravity, to the lower extremity of its movement relative to the base portion and a workpiece supported from the support portion may be gravity fed to the blade of the band saw.

5 Claims, 13 Drawing Figures

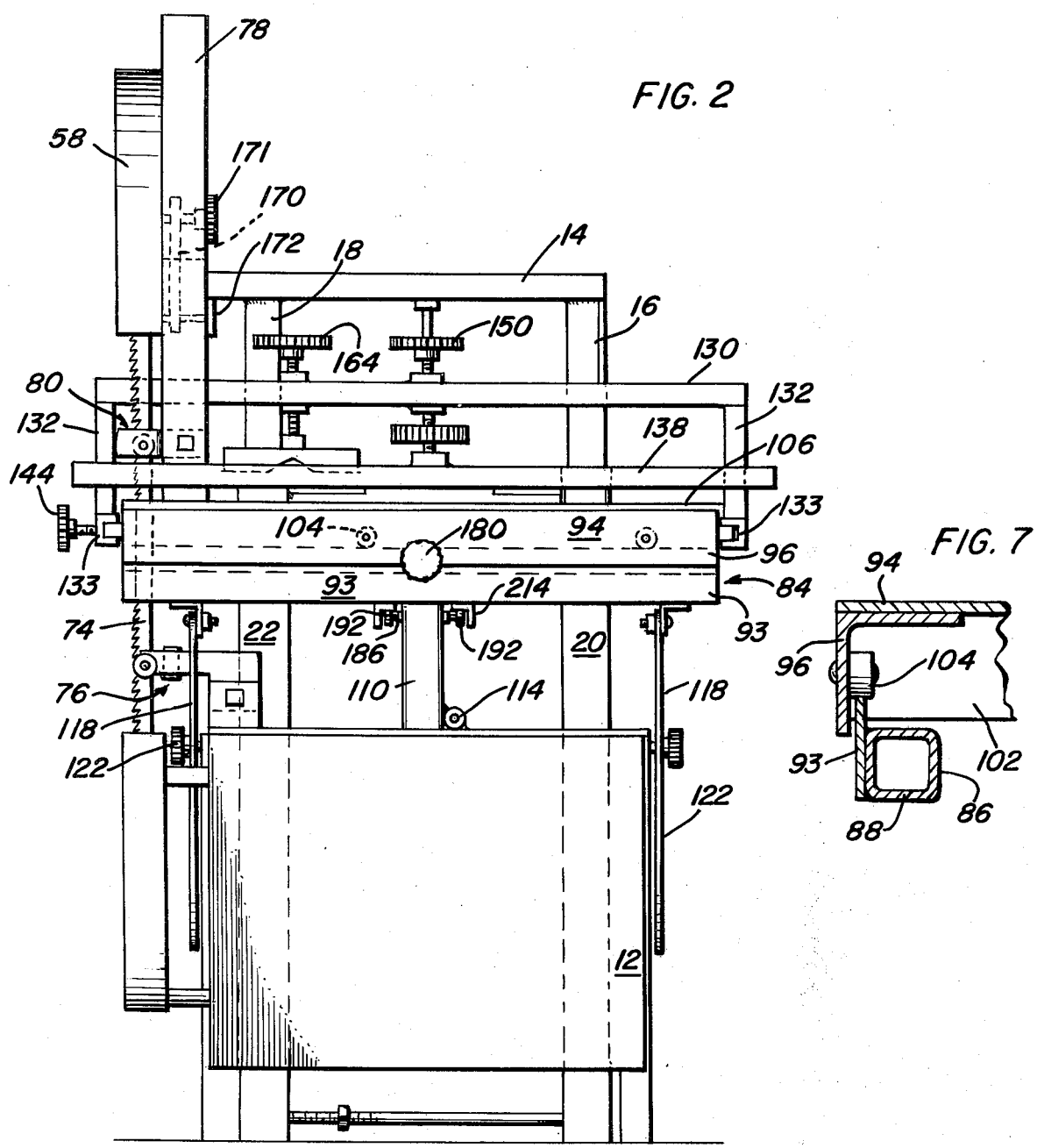
FIG. 2
FIG. 7
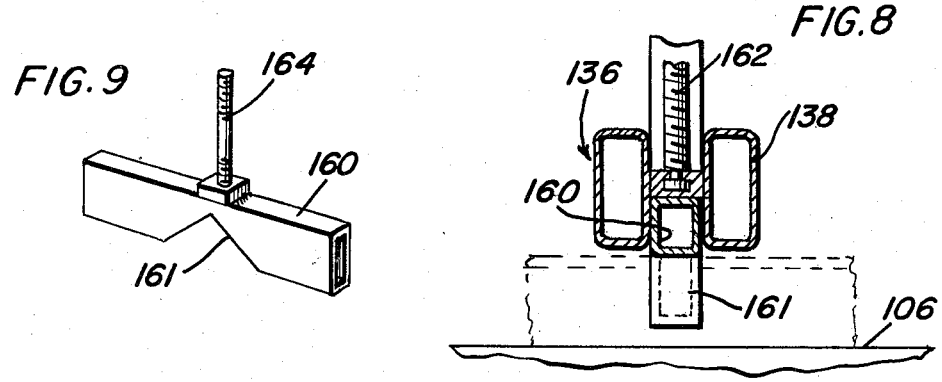
FIG. 9
FIG. 8

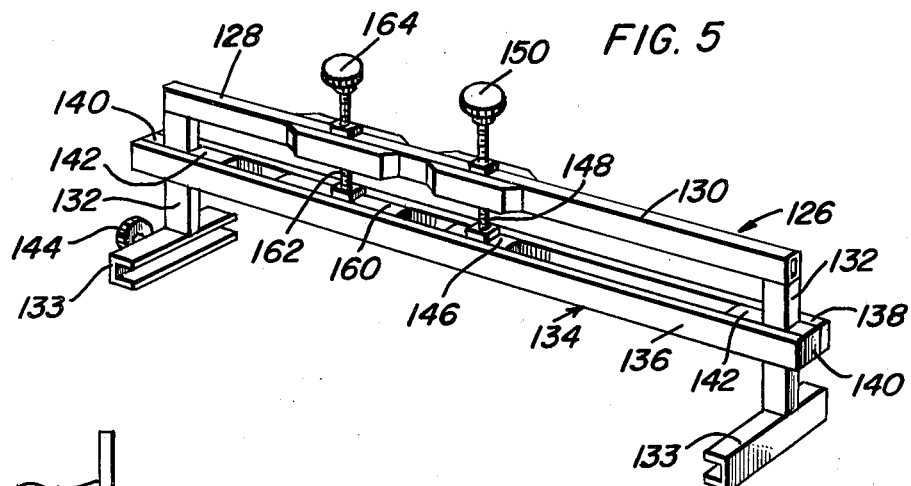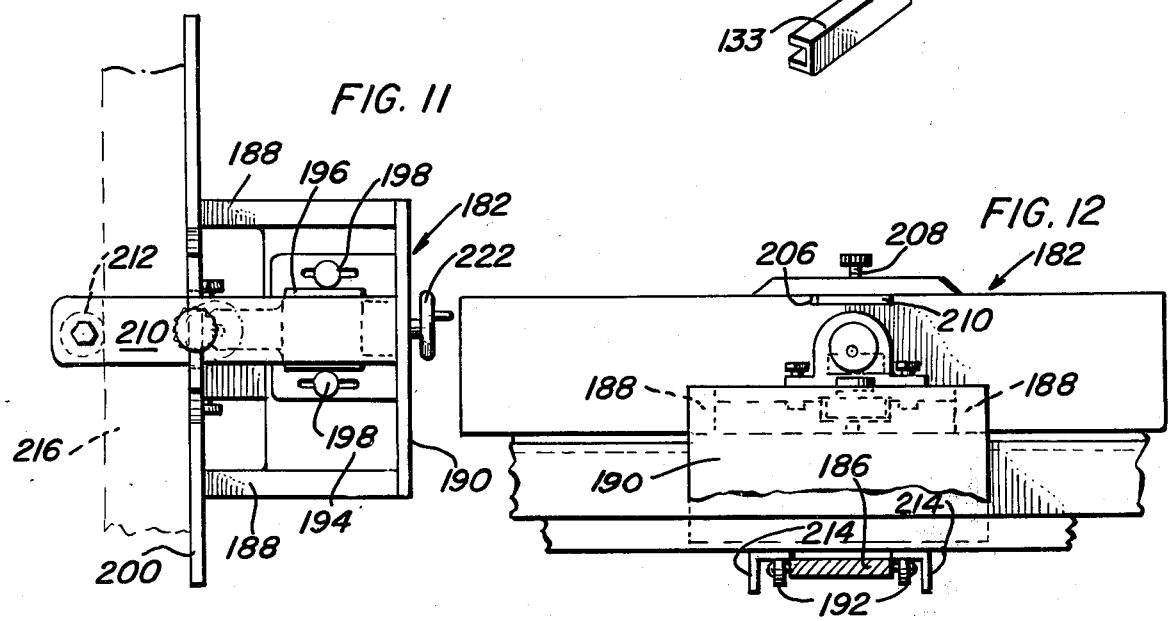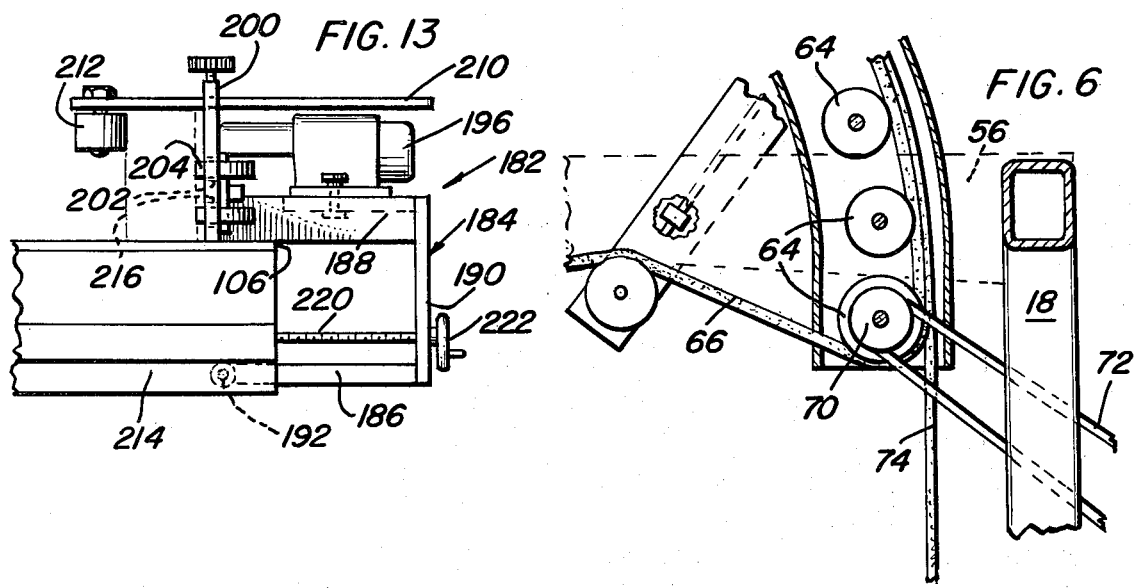

BAND SAW MACHINE

BACKGROUND OF THE INVENTION

In many instances, and especially when heavy gauge metal components are to be cut by a band saw, the sawing operation must be accompanied by slow gradual feed of the work relative to the band saw blade. Attempts at feeding the work to the band saw blade at a rate faster than proper causes the life of the band saw blade to be considerably shortened and necessitates frequent sharpening of the band saw blade. Also, feeding the workpiece to the blade at a rate faster than proper can also cause excessive wear on the blade and the blade guide structure adjacent the cut being made as well as an irregular cut to be made in the workpiece.

SUMMARY OF THE INVENTION

The band saw machine of the instant invention is constructed in a manner whereby automatic gradual and yieldable feeding of a workpiece relative to a band saw blade may be accomplished without resorting to extensive positive feed mechanisms. The band saw machine includes structure which may be readily adjusted in order to vary the amount of feed pressure which may be exerted (by gravity) on a workpiece. Still further, the band saw machine includes novel holddown structure by which workpieces of various configurations may be readily stationarily supported from the workpiece support portion of the support table of the band saw machine.

The main object of this invention is to provide a band saw machine which will be capable of supporting and gradually and yieldably feeding a workpiece relative to the blade of the band saw machine.

Another object of this invention, in accordance with the immediately preceding object, is to provide a band saw machine including structure by which the yieldable force applied for feeding the workpiece into the blade of the band saw machine may be adjusted.

Another very important object of this invention is to provide a band saw machine in accordance with the preceding objects and also including structure for positive feed of a workpiece relative to the band saw blade.

A final object of this invention to be specificaly enumerated herein is to provide a band saw machine in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 2 is a front elevational view of the band saw machine as seen from the left side of FIG. 1;

FIG. 5 is a perspective view of the workpiece holddown structure carried by the workpiece support portion of the support table;

FIG. 6 is a fragmentary enlarged vertical view illustrating the manner in which the driving torque is transferred to the upper drive belt of the band saw machine;

FIG. 7 is an enlarged fragmentary vertical sectional view illustrating the manner in which the workpiece support portion of the support table is guidingly supported for rectilinear shifting relative to the base portion of the support table;

FIG. 8 is an enlarged fragmentary vertical sectional view illustrating the manner in which one of the workpiece holddown elements is adjustably supported from the workpiece holddown portion of the support table;

FIG. 9 is a perspective view of the workpiece holddown element illustrated in FIG. 8;

FIG. 11 is a top plan view of a motorized workpiece drive assembly which may be used in conjunction with the band saw machine;

FIG. 12 is a front elevational view of the workpiece drive assembly illustrated in FIG. 11; and FIG. 13 is a side elevational view of the workpiece drive assembly illustrated in FIGS. 11 and 12.

DESCRIPTION OF THE PREFERRED EMBODIMENT

Figure 1:
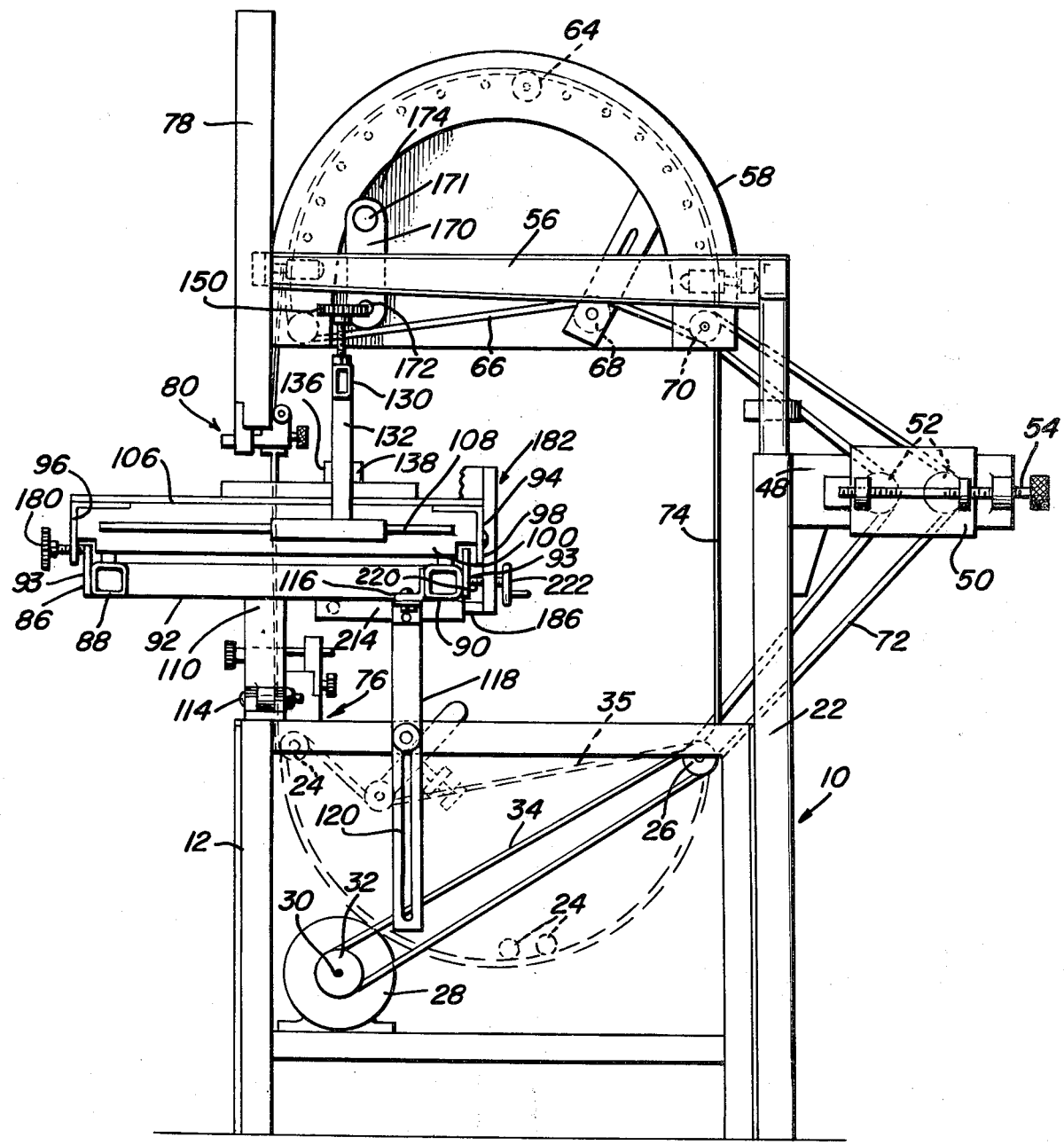
FIG. 1 is a side elevational view of the band saw machine of the instant invention.
Figure 10:
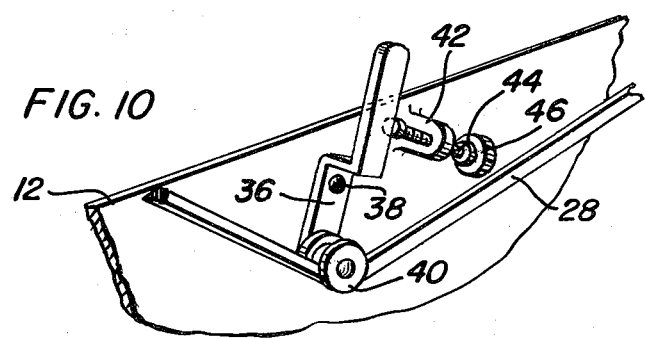
FIG. 10 is a fragmentary perspective view illustrating the manner in which the lower drive belt is tightened.

Referring now more specifically to the drawings, the numeral 10 generally designates a band saw machine which comprises an improvement over the band saw disclosed in my prior U.S. Pat. No. 3,142,321, dated July 28, 1964. The band saw machine 10 includes a stationary base 12 from which a vertically adjustable head frame 14 is supported. The frame 14 includes depending legs 16 and 18 which are telescopingly and downwardly engaged in upstanding tubular members 20 and 22 carried by the base 12. The base includes a plurality of rollers 24 journaled therefrom in an upwardly opening semi-circular path disposed in a vertical plane. The roller 24 adjacent the tubular member 22 includes a double power input pulley 26 and an electric motor 28 is supported from the base 12. The motor 28 includes a power output shaft 30 upon which a drive pully 32 is mounted and a drive belt 34 is trained about the pulley 32 and the double pulley 26. A drive belt 35 is trained over the rollers 24 and the portion of the belt 35 extending between the end rollers 24 has its midportion adjustably deflected by means of a belt tensioning lever 36 pivotally supported from the base 12 as at 38. The lever 36 has a tensioning pulley 40 mounted on one free end portion thereof and the pulley 40 is engaged with the belt 35. In addition, the base 12 includes a support bracket 42 through which a threaded shank 44 is threadedly engaged. One end of the shank 44 includes a hand knob 46 and the other end of the shank 44 abuts the end of the lever 36 remote from the pulley 40 and the lever 36 may therefore be adjustably angulated against the tension of the belt 35 in order to vary the tension of the belt 35.

The tubular member 22 includes a horizontally rearwardly outwardly projecting arm structure 48 upon which a slide body 50 is mounted. The slide body 50 journals a pair of pulleys 52 and a threaded adjustment screw 54 is connected between the body 50 and the arm structure 48 for adjustably shifting the body 58 along the arm structure 48.

Figure 3:
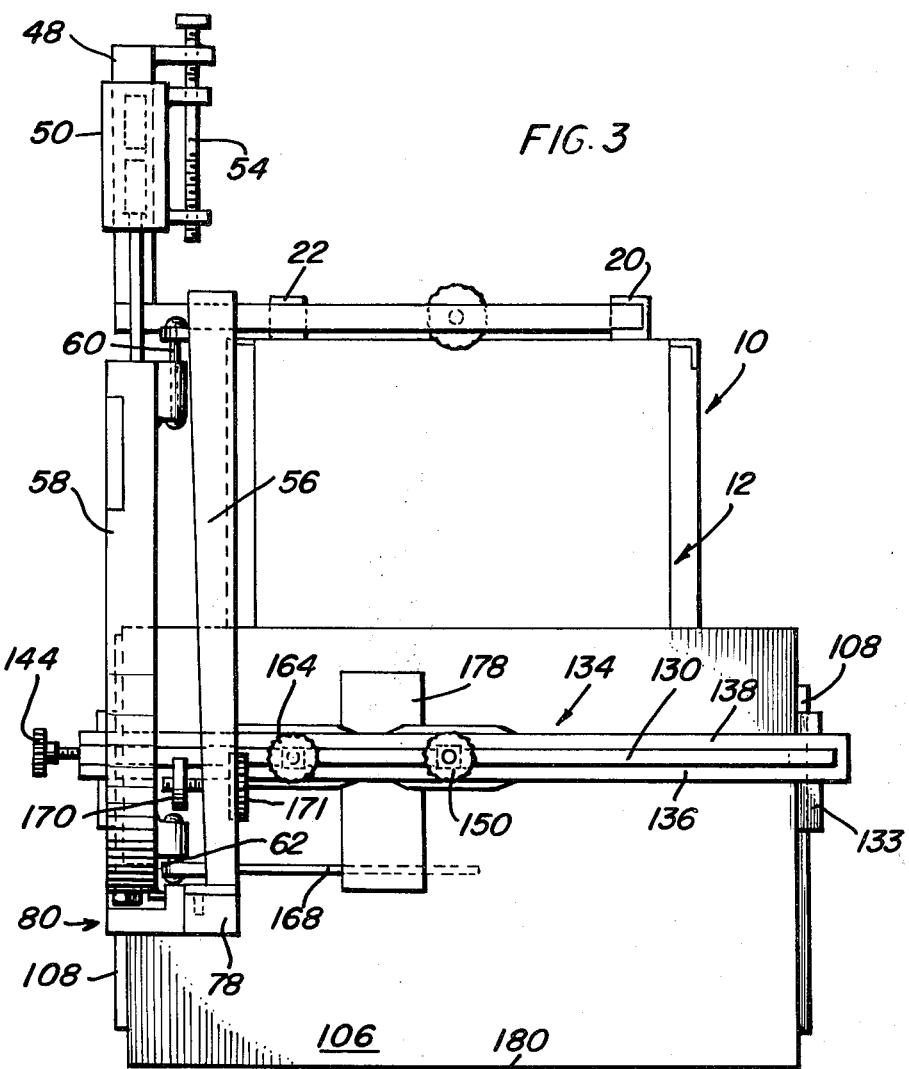
FIG. 3 is a top plan view of the band saw machine.

The upper right hand portion of the head frame 14 includes a forwardly projecting arm assembly 56 and a downwardly opening generally semicircular frame 58 is pivotally supported from the arm assembly 56 as at 60 and 62, see FIG. 3, for slight angular positioning of the frame 58 about a horizontal front to rear extending axis extending longitudinally of the arm assembly 56. The frame 58 includes a plurality of rollers 64 corresponding to the rollers 24 and a belt 66 is trained about the rollers 64 and over an adjustable tension roller 68. The roller 64 adjacent the leg 18 includes a pulley 70 and a power transmission belt 72 is trained over the pulley 70, the pulleys 52 and the pulley 26, whereby the motor 28 frives both the belt 35 and the belt 66.

An endless band saw blade 74 is trained over the belts 35 and 66 and the base 12 includes a lower band saw blade guide structure referred to in general by the reference numeral 76 and the forward portion of the frame 58 includes a vertically adjustable upstanding support 78 from whose lower end a second band saw blade guide structure 80 is supported.

A workpiece support table referred to in general by the reference numeral 84 is provided and the support table 84 includes a rectangular frame 86 defining a base portion for the support table. The frame 86 includes front and rear longitudinal tubular members 88 and 90 interconnected at their opposite ends and at their midportions by means of transversely extending tubular braces 92 secured between the longitudinal members 88 and 90. The outer sides of the longitudinal members 88 and 90 include upstanding flanges 93 secured thereto which project upwardly above the upper surfaces of the longitudinal members 88 and 90. The workpiece support table 84 further includes an upper workpiece supporting portion 94 and it may be seen that the workpiece supporting portion 94 includes a pair of front and rear longitudinal angle members 96 and 98 interconnected at their opposite ends by means of a pair of transverse end walls 100 and 102. A pair of longitudinally spaced rollers 104 are journaled from the end portions of the longitudinal members 96 and 98 and the rollers 104 are rollingly engaged with the upper surface portions of the flanges 93 and support the portion 94 from the frame 86. Further, the upper marginal portions of the angle members 96 and 98 in the upper marginal edge portions of the opposite end transverse members 100 and 102 are interconnected by means of a table top 106 secured thereover. Further, the outer side surfaces of the transverse members 100 and 102 include outwardly projecting and longitudinal ribs 108.

The center transverse member 92 secured between the longitudinal members 88 and 90 includes a depending leg 110 and the lower end of the leg 110 is hingedly supported from the base 12 as at 114 for angular displacement about a front to rear extending axis. Also, the opposite ends of the longitudinal member 90 include inner angle brackets 116 to which the upper ends of a pair of depending stiff but bendable legs 118 are secured. The lower ends of the legs 118 are slotted as at 120 and the right and left hand sides of the base 12 include horizontally outwardly projecting and threadedly supported hand screws 122 which extend through the slots 120 and which may be tightened in order to frictionally clamp the legs 118 in vertically adjusted shifted position relative to the base 12. From a comparison of FIGS. 2 and 4 of the drawings, it may be seen that the legs 118 may be secured in different vertically shifted positions so that the base portion 86 of the work support table 84 may be positioned in an inclined position.

A work holddown structure is referred to in general by the reference numeral 126 and includes a U-shaped frame 128 having an upper bight portion 130 and opposite end depending legs 132 provided with inwardly opening horizontal channel members 133 at their lower ends. The channel members 133 are slidably engaged with the outstanding ribs 108 carried by the transverse members 100 and 102 and a pressure head 134 comprising a pair of parallel bars 136 and 138 extend along opposite sides of and slidably receive the legs 132 therebetween. The ends of the bars 136 and 138 project beyond the remote sides of the legs 132 and are interconnected by means of blocks 140 secured therebetween. In addition, further blocks 142 are secured between the end portions of the bars 136 and 138 between the legs 132 and each leg 132 is thus slidably received between the bars 136 and 138 and the corresponding pair of blocks 140 and 142. One of the channel members 133 includes a set screw 144 threadedly engaged through of the bight portion thereof and engageable with the corresponding rib 108. In this manner, the holddown structure 126 may be secured in adjusted position on the workpiece supporting portion 94.

A center block 146 is slidably received between the midportions of the bars 136 and 138 and the lower end of a clamp screw 148 is journaled from the block 146. The clamp screw 148 is threaded vertically through the center of the bight portion 130 and has a turning knob 150 on its upper end. Accordingly, the clamp screw or adjusting screw 138 may be turned to raise and lower the pressure head 134 relative to the table top 106.

It may also be seen from FIG. 5 of the drawings that an elongated block 160 is slidably disposed between the bars 136 and 138 between the block 146 and the left hand block 142. The lower end of an adjusting screw 162 is journaled from the center portion of the block 160 and the upper portion of the adjusting screw 162 is threaded through the bight portion 130 and provided with an upper end turning knob 164. The block 160 comprises a tubular member downwardly notched as at 161, see FIGS. 8 and 9, and may therefore be utilized to clamp cylindrical stock in stationary position on the upper surface of the table top 106.

The table top 106 has a slot 168 formed therein and the transverse member 102 has a corresponding slot (not shown) formed therein whereby an entrance throat for the band saw blade 74 is provided.

An upstanding bracket 170 (see FIG. 1) is mounted on an outer end portion of the arm 56. The bracket 170 projects below and above the arm 56 and above and below the pivot axis of the frame 56 defined by the pivot points 60 and 62. The upper and lower ends of the bracket 170 includes adjusting screws 170 and 172 threadedly engaged therethrough and which bear upon a vertical portion 174 of the frame 58 extending above and below the pivot axis defined by the pivot points 60 and 62. Accordingly, the abutment screws 170 and 172 may be adjusted in order to properly align the frame 58 relative to the lower rollers 24 in order to insure that the blade 74 will track properly on the belts 35 and 66.

Figure 4:
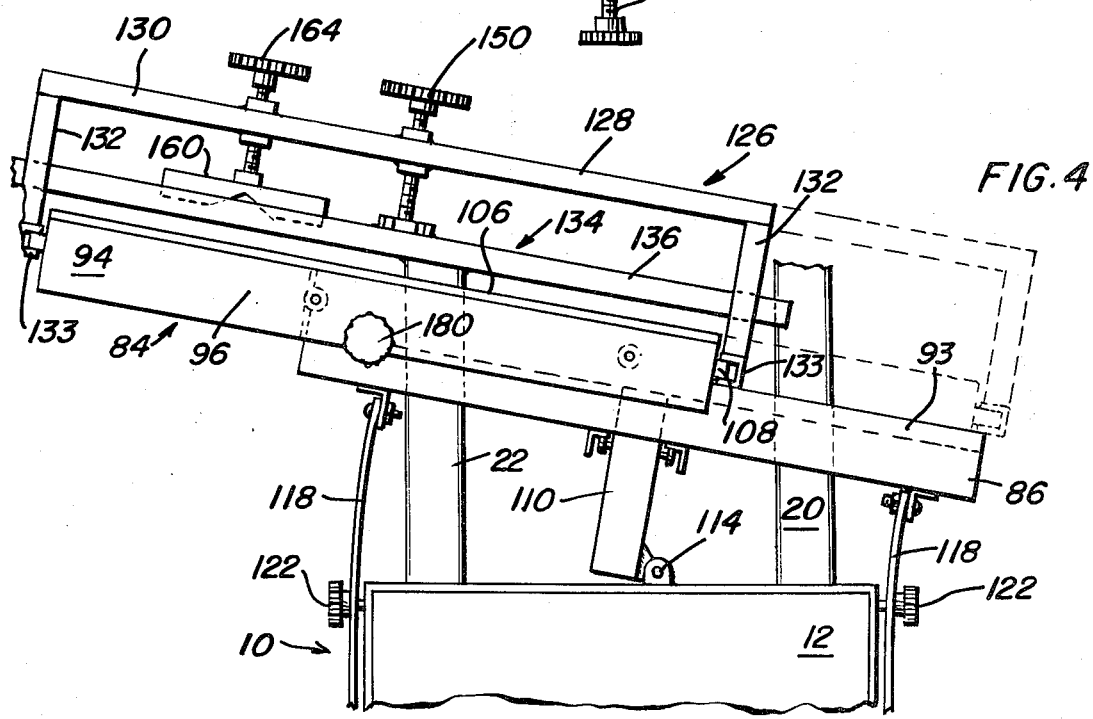
FIG. 4 is an enlarged fragmentary front elevational view of the band saw machine illustrating the workpiece support table in adjusted inclined position and an alternate position of the workpiece support portion of the table in phantom lines.

In operation, a workpiece 178 may be clamped beneath the pressure head 134 by adjustment of the adjustment screw 148 with the workpiece 178 extending across the slot 168. The workpiece 178 is clamped to the table top 106 after the upper work supporting portion 94 of the support table 84 is shifted to a position projecting outwardly to the left of the base portion 86 so that the portion of the blade 74 extending between the guide structures 76 and 80 is disposed in the inner end of the slot. Then, with the assumption that the base portion 86 of the workpiece support table 84 is inclined as illustrated in FIG. 4 of the drawings, the upper work supporting portion 94 may be released for movement by gravity downwardly along the base portion 86 in order to gradually feed the workpiece 78 to the blade 74.

The front longitudinal angle member 96 includes a set screw 180 threadedly engaged therethrough and the inner end of the set screw 180 is engageable with the corresponding flange 93. In this manner, the set screw 180 may be utilized to retain the upper work supporting portion 94 of the workpiece support table 84 in stationary position relative to the base portion or frame 86 of the table.

With attention now invited more specifically to FIGS. 11 through 13 of the drawings, there may be seen a power feed assembly referred to in general by the reference numeral 182. The assembly 182 includes a C-shaped frame referred to in general by the reference numeral 184 consisting of a lower horizontal bar 186 and a pair of upper bars 188. Corresponding ends of the bars 186 and 188 are interconnected by means of a vertical bight portion 190 and the free end of the bar 186 includes a pair of opposite side rollers 192 journaled therefrom. The base ends of the bars 188 are interconnected by means of a mounting plate 194 which is also secured to the bight portion 190 and a gear head motor 196 is adjustably supported from the mounting plate 194 as at 198 for shifting longitudinally of the bars 188.

The free ends of the bars 188 are interconnected by means of an upstanding fence plate 200 having a pair of centrally disposed vertically spaced slots 106 formed therein. The gear head motor 196 includes a vertical output shaft having a pair of drive wheels 204 mounted thereon which project through the openings or slots 202 and the upper central marginal portion of the fence plate 200 has an opening 206 formed therethrough and a set screw 208 threadedly engaged therewith, the set screw 208 being projectable into the opening 206. A bar 210 is slidably received through the opening 206 and has a depending roller 212 mounted on its end disposed on the side of the plate 200 remote from the motor 196. The set screw 208 may be utilized to secure the bar 210 in adjusted shifted position and the frame 184 may be engaged with the rear side of the base portion 86 after the upper work supporting portion 94 has been removed. The base portion or frame 86 includes a pair of transverse angle members 214 with which the rollers 192 may be rollingly engaged.

From FIG. 13 of the drawings, it may be seen that a workpiece 216 may be disposed between the roller 212 and the wheels 204 and upon operation of the gear head motor 196, the wheels 204 will be driven in order to advance the workpiece 216 along the fence plate 200. Of course, the frame 84 is positioned so that the workpiece 216 may be advanced relative to the blade 74.

Further, an adjusting screw 220 provided with a hand crank 222 is provided and is threadedly engaged through tubular member 90 and journaled from the bight portion 190, whereby the adjusting screw may be turned to adjustably shift the power feed assembly 182 transversely of the path of movement of the workpiece supporting portion 94 of the support table 84.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination, a saw including a base relative to which an elongated upstanding saw blade portion is longitudinally movable, a workpiece support table supported from said base, said support table including a base portion supported from said base for stationary angular adjustment about a generally horizontal axis extending transversely of the upstanding plane in which said blade portion is disposed and a table top supported from said base portion for guided shifting relative to said base portion along a path fixed relative to said base portion, disposed in said plane and angularly displaceable with said base portion relative to said base, said table top being supported from said base portion for guided gravity movement downwardly along said path, when the latter is inclined, and clamp means supported from said top for movement toward and away from the latter, said clamp means including a supportive hold-down structure therefor mounted from said table top for adjustable shifting transversely of said path and substantially normal to said plane and having a mounting portion thereof spaced above said table top and relative to which said clamp means is adjustably shiftable toward and away from said table top.

2. The combination of claim 1 wherein said mounting portion includes a clamp member supported therefrom for adjustable shifting toward and away from said table top relative to said mounting portion.

3. The combination of claim 2 wherein said clamp member includes a downwardly opening inverted generally V-shaped notch for embracingly receiving a workpiece disposed on said table top and to be clamped in position thereon by said clamp member.

4. The combination of claim 1 wherein said saw includes a pair of vertically spaced upper and lower blade support portions, said upper support portion including a plurality of guide means disposed in and spaced along an upwardly convex semi-circular path lying generally in an upright plane, said lower blade support portion including a plurality of guide means disposed in and spaced along a downwardly convex semi-circular path also lying generally in said upright plane, said upstanding saw blade portion including a portion of an endless band saw blade supported from said guide means for lengthwise advancement of said band saw blade about said semi-circular paths.

5. The combination of claim 4 including means supporting one of said support portions for adjustable angular displacement, relative to the other support portion, about an axis extending generally between the opposite ends of the corresponding semi-circular path.

* * * * *